(12) United States Patent
Stanek

(10) Patent No.: US 10,352,292 B2
(45) Date of Patent: Jul. 16, 2019

(54) SYSTEM FOR CONVERTING OF SWELL OR OF WAVE ENERGY

(71) Applicant: Jean-Luc Stanek, St. Medard d'Eyrans (FR)

(72) Inventor: Jean-Luc Stanek, St. Medard d'Eyrans (FR)

(*) Notice: Subject to any disclaimer, the term of this patent is extended or adjusted under 35 U.S.C. 154(b) by 767 days.

(21) Appl. No.: 14/419,929

(22) PCT Filed: Aug. 7, 2013

(86) PCT No.: PCT/FR2013/051909
§ 371 (c)(1),
(2) Date: May 29, 2015

(87) PCT Pub. No.: WO2014/023920
PCT Pub. Date: Feb. 13, 2014

(65) Prior Publication Data
US 2015/0267676 A1    Sep. 24, 2015

(30) Foreign Application Priority Data
Aug. 7, 2012   (FR) ...................... 12 02196

(51) Int. Cl.
*F03B 13/14*       (2006.01)
*F03B 13/24*       (2006.01)

(52) U.S. Cl.
CPC .............. *F03B 13/24* (2013.01); *F03B 13/14* (2013.01); *F03B 13/142* (2013.01);
(Continued)

(58) Field of Classification Search
CPC ...... F03B 13/14; F03B 13/142; F03B 13/148; F03B 13/24; F05B 2240/40; F05B 2240/9151; Y02E 10/32; Y02E 10/38
See application file for complete search history.

(56) References Cited

U.S. PATENT DOCUMENTS 4,622,473 A * 11/1986 Curry .................... F03B 13/187
290/1 R
7,554,216 B2 * 6/2009 Winsloe ................ F03B 13/142
290/42

(Continued)

FOREIGN PATENT DOCUMENTS

DE   10 2009 008 211 A1   8/2010
DE   10 2009 013 014 A1   9/2010
(Continued)

*Primary Examiner* — Michael Leslie
(74) *Attorney, Agent, or Firm* — Womble Bond Dickinson (US) LLP

(57) ABSTRACT

The invention relates to a system for converting the of swell and/or of wave energy, including a network of water compression columns (1), each having: a lower end (110) to be dipped into a volume of water, the lower end (110) having an opening (111) for collecting water in the column (1), so as to form a chamber including a gas in an upper portion (120) of the column (1), a first non-return valve (4) in fluid communication from said column (1) to an overpressure chamber (2) shared by the columns, and a second non-return valve (5) in fluid communication from a low-pressure chamber (3) shared by the columns to said column (1), wherein the overpressure (2) and low-pressure (3) chambers are fluidly connected via a turbine (6) and the columns (1) of the network are arranged contiguously, and the network extends in at least two non-parallel directions.

26 Claims, 8 Drawing Sheets

Figure 2:
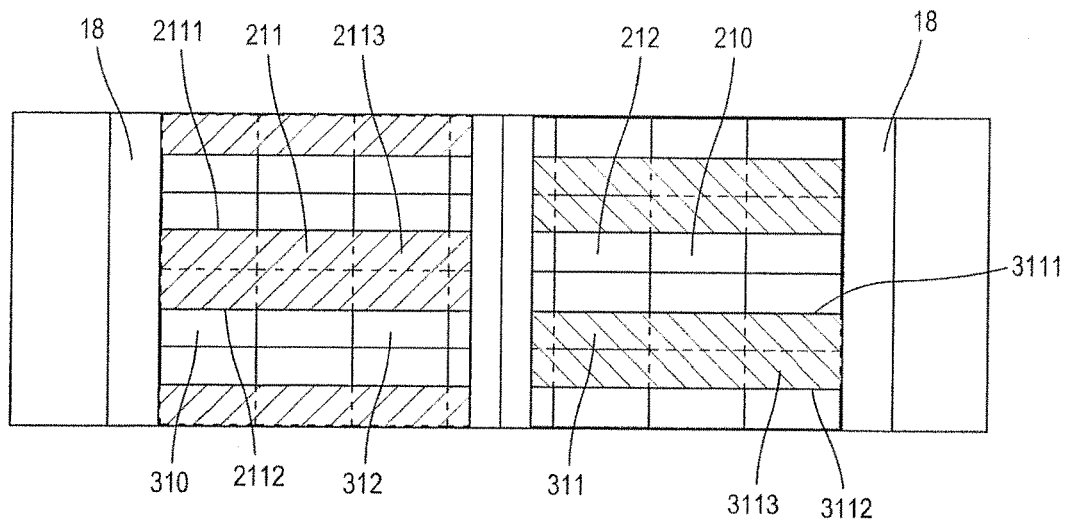

(52) U.S. Cl.
CPC ........ *F03B 13/148* (2013.01); *F05B 2240/40* (2013.01); *F05B 2240/9151* (2013.01); *Y02E 10/32* (2013.01); *Y02E 10/38* (2013.01)

(56) References Cited

U.S. PATENT DOCUMENTS

| | | | |
|---|---|---|---|
| 7,836,689 B2 * | 11/2010 | Sieber | F03B 13/142 290/53 |
| 8,970,056 B2 * | 3/2015 | Solheim | B63B 21/50 290/44 |
| 2009/0102199 A1 | 4/2009 | Voropaev | |
| 2011/0187102 A1 * | 8/2011 | Sirseth | F03B 13/145 290/42 |

FOREIGN PATENT DOCUMENTS

| | | |
|---|---|---|
| GB | 2 161 544 A | 1/1986 |
| GB | 2 325 964 A | 12/1998 |
| JP | 25002453 B | 2/2016 |
| WO | WO 2010/049708 A2 | 5/2010 |
| WO | WO 2010/067177 A2 | 6/2010 |

\* cited by examiner

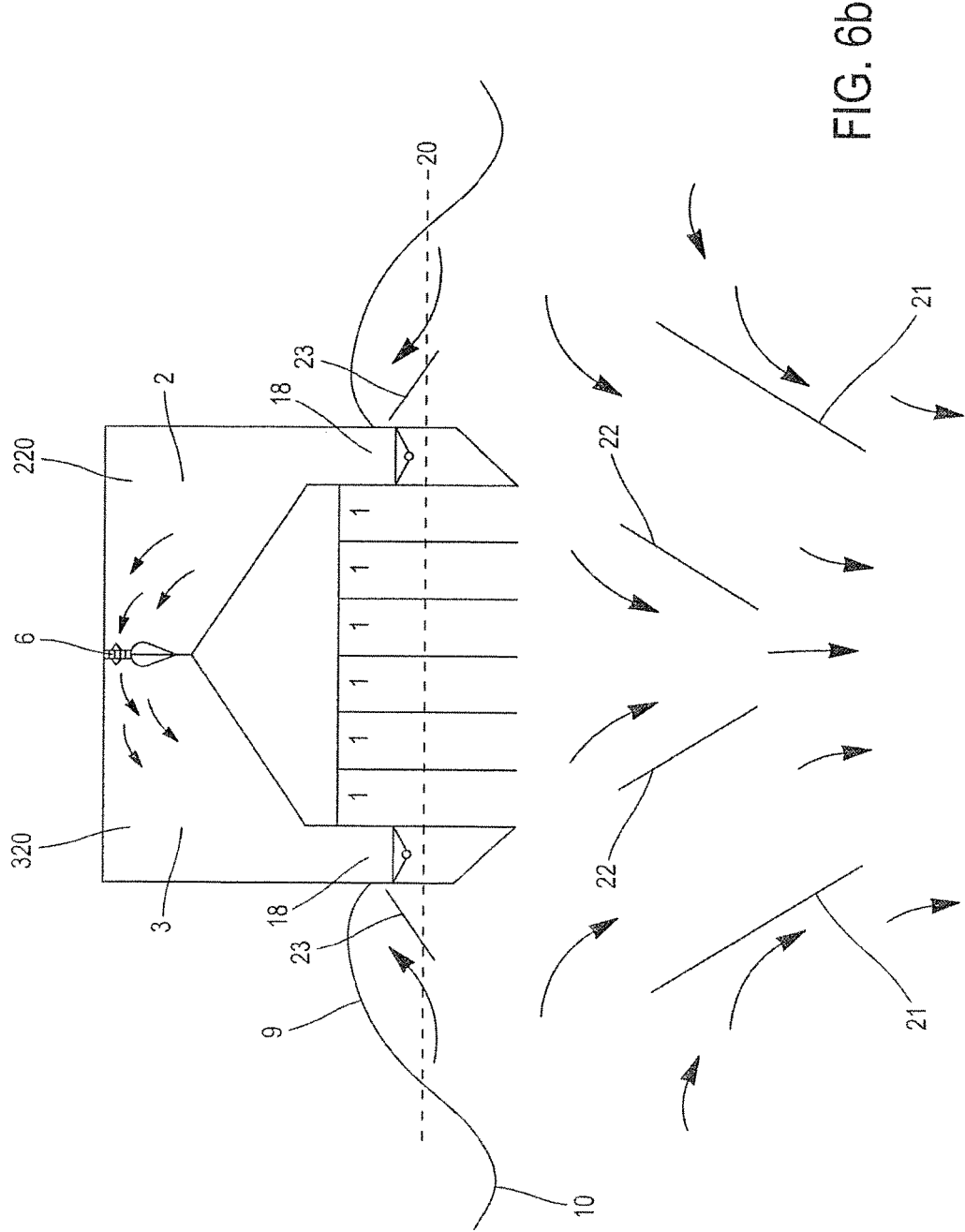

SYSTEM FOR CONVERTING OF SWELL OR OF WAVE ENERGY

TECHNICAL FIELD

This pertains to the technical field of systems for converting energy derived from swells.

STATE OF THE ART

Systems for converting energy derived from swells are known, including at least one column containing water which is oscillating in a vertical direction.

Such a column generally consists of a chamber that is open at its lower portion and is partially immersed in a volume of water subject to swell action.

In this manner, the movement of the swells periodically causes an overpressure in the lower portion of the column.

The rising motion of the water level in the column that results in such an overpressure compresses a gas (typically air) located in the upper portion of the column.

The compressed gas is directed by ducts toward a device such as an air turbine generator to convert the energy derived from the motion of the water, into electrical energy for example.

The column can be equipped with a system of valves allowing admission of the gas (typically ambient air) into the column when the water level drops in this column as a result of motions of the swells.

Systems such as this exist that use a bidirectional air turbine generator, the direction of operation whereof changes depending on the motion of the water in the column.

Another configuration of such systems, wherein the flow of gas is made unidirectional, is also known.

Document GB 2 161 544 A illustrates such a configuration.

In such a configuration, each column includes in its upper portion a first check valve allowing circulation of compressed gas toward an air turbine generator, and a second check valve allowing intake of gas from the low-pressure side of the air turbine generator.

The flow of gases derived from the columns are captured by collectors, and the gas is also redistributed between columns, after passage through the air turbine generator, by collectors. These collectors are implemented in the form of arrays of pipes.

Known systems thus present a potentially advantageous solution for converting swell energy. And the unidirectional gas flow configuration mentioned above constitutes a particularly promising option.

The architecture of these known systems is generally proposed with a series of columns, the columns being arranged in line and each column being connected to the air turbine generator.

But these known systems are complex and costly to produce, and can only be implemented in locations having a strong swell.

Indeed, the operation of these systems requires that the line of columns be aligned in a particular way relative to propagation direction of the swells.

In addition, the compressed gas circulation in the arrays of pipes induces a pneumatic inertia of the system, which penalizes its efficiency. These pipes also generate head losses which also penalize the efficiency of the system.

Moreover, such structures have considerable exposure to the sea, and the columns must consequently be given very considerable dimensions (thickness of the column walls, etc.).

Finally, if the swells or the diffraction motions at the surface of the water are such that the wave at the surface of the water forms a front propagating parallel to the lines, all the columns will be under overpressure at the same time and under vacuum at the same time.

What is more, under this assumption, if the system is a floating system, it risks rising at the whim of the swell without change in the level of water in its columns.

There results in a drop in efficiency, because the system is operating in two successive gas entry and gas exit steps for all the columns, and the upstream and downstream collectors of the air turbine generator are saturated by the entering or departing gas instead of the flow being shared between the two collectors.

Presentation

One goal of the invention is to offset at least one of the shortcomings presented earlier.

To this end, a system for converting energy derived from swells and/or from waves is provided, including an array of water compression columns, each column including:

a lower end designed to be immersed in a volume of water subjected to the action of the swell, the lower end having an opening for accommodating water from the water volume in the column, so as to form a chamber containing a gas in an upper portion of the column, a first check valve in fluid communication from said column to an overpressure vessel common to the columns of the array, a second check valve in fluid communication from a vacuum vessel common to the columns of the array to said column, wherein the overpressure vessel and the vacuum vessel are fluidically connected by a turbine, and wherein the columns of the array are arranged contiguously, and in that the array extends in at least two non-parallel directions.

The invention is advantageously supplemented by the following features, taken together or in any one of their technically feasible combinations:

for each column, the first check valve and the second check valve are arranged above the column, the first check valves of the columns of the system are positioned along first lines, and the second check valves of the columns of the system are positioned along second lines, the lines are rectilinear, mutually parallel alignments, the valves form an alternation of first lines and second lines above the columns, each first line is positioned at a first portion of the overpressure vessel and each second line is positioned at a second portion of the vacuum vessel, the first portions and second portions being positioned alternately above the columns, each first portion, respectively second portion, has an increase, respectively decreasing cross-section in the gas flow direction, the first portions are each connected to one and the same first chamber of the overpressure vessel positioned between each first portion and the turbine, and the second portions are each connected to one and the same second chamber of the vacuum vessel positioned between each second portion and the turbine, the first chamber and the second chamber are positioned over the alternation of first portions and second portions, the first chamber and the second chamber are positioned on either side of the alternation of first portions and of second portions, the first chamber, respectively second chamber, has an increasing, respectively decreasing, cross-section in the gas flow direction, each first portion includes two successive first lines and each second portion includes two successive second lines, each column includes an internal float device designed to prevent water from penetrating from the column into the valves, each column includes an internal float device designed to prevent air from leaving the column through the opening, each column includes an internal flow device designed to move within the column, the internal float device having means for cleaning the inner walls of the column, a pressure regulating device, designed to adjust the mean of the pressure in the overpressure vessel and of the pressure in the vacuum vessel relative to atmospheric pressure, the overpressure vessel and/or the vacuum vessel includes a water drainage device, means for deflecting the swell relative to the openings in the columns, the deflection means include movable baffles positioned on either side, and or below the columns.

The invention also relates to a unit for converting energy derived from swells and/or from waves including a plurality of systems as previously described, the systems being interconnected.

DRAWINGS

Figure 1:
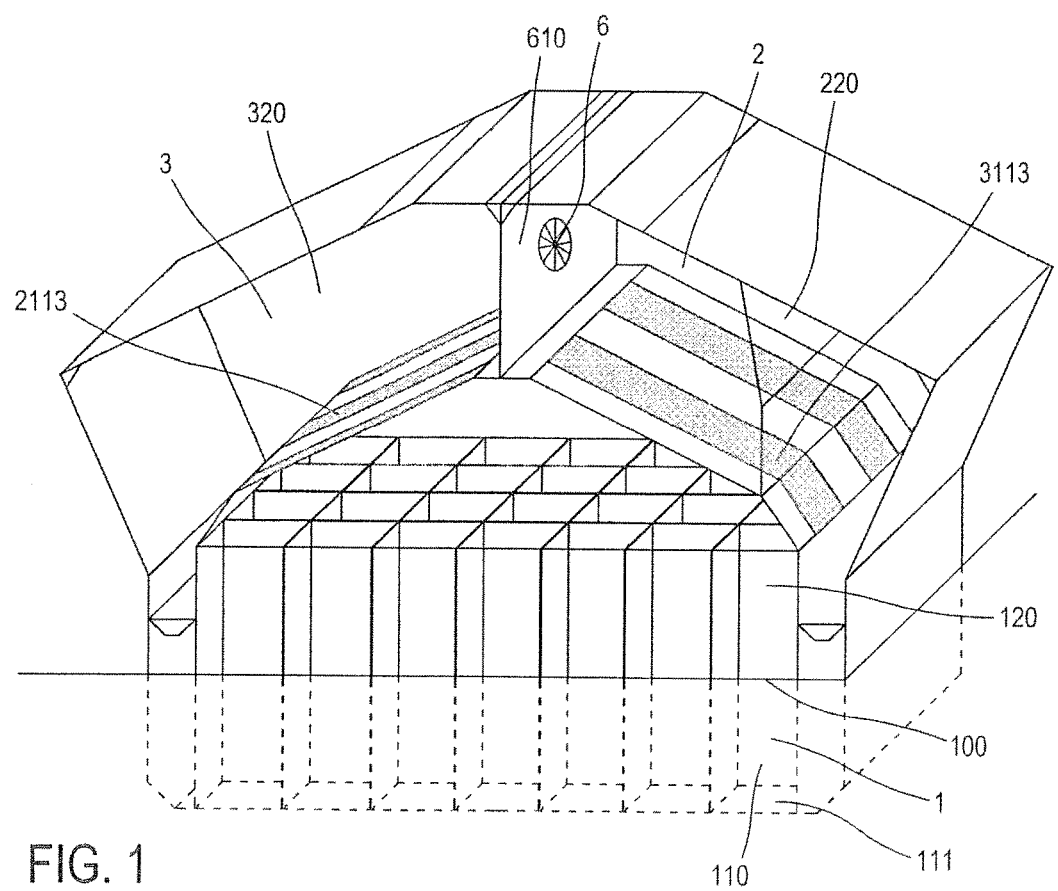
Figure 3:
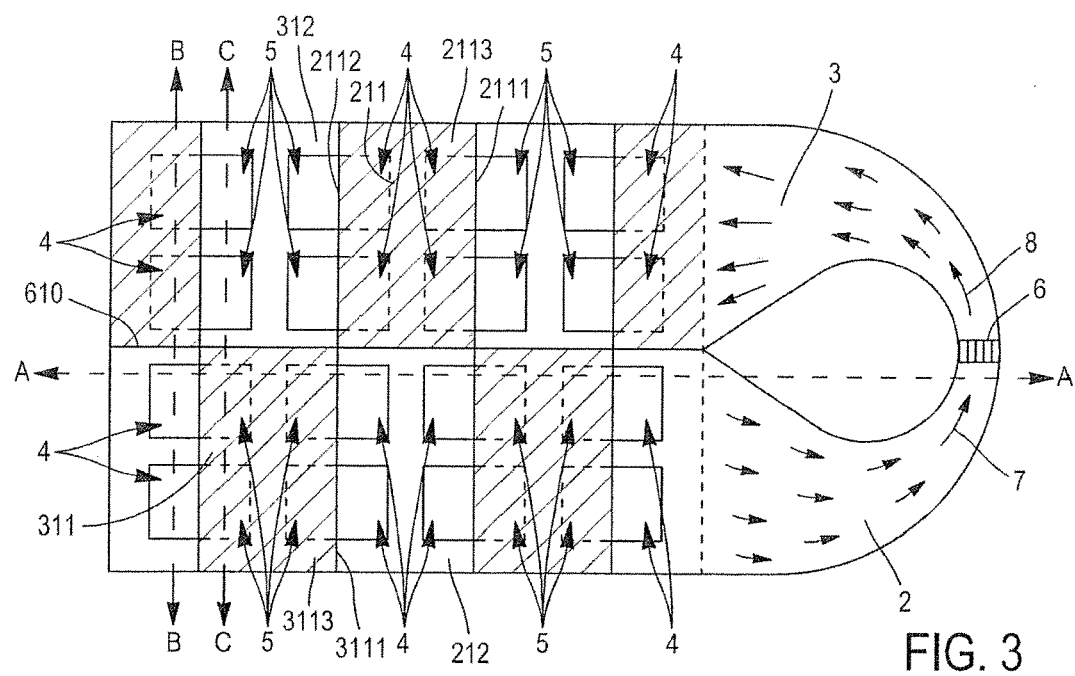
Figure 4:
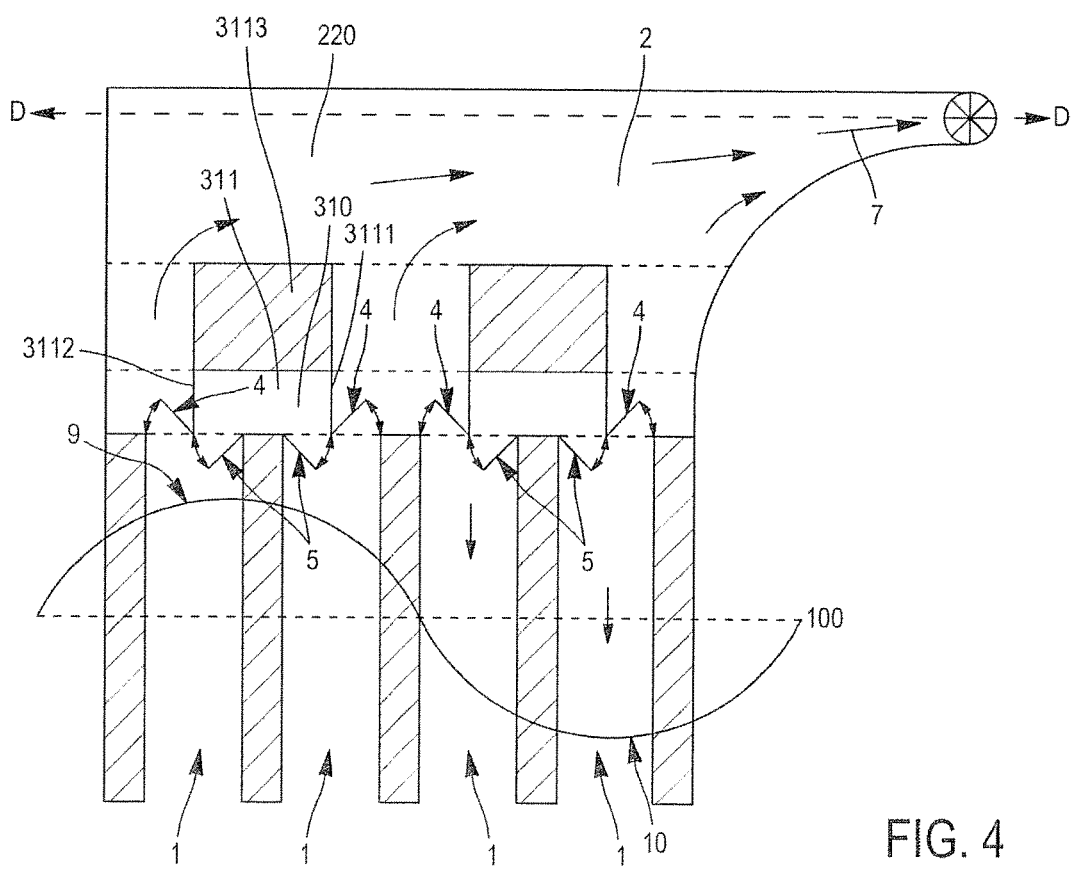
Figure 5A:
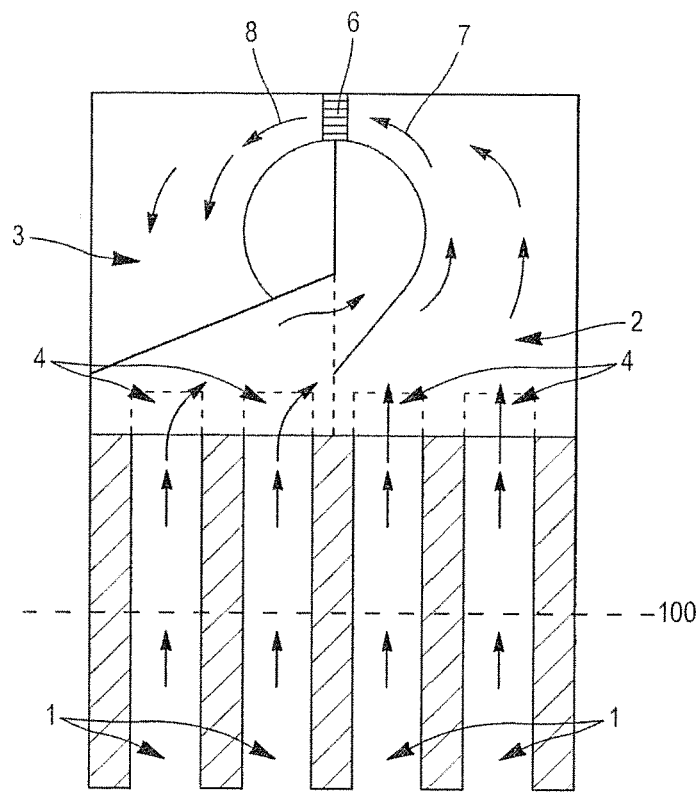
Figure 5B:
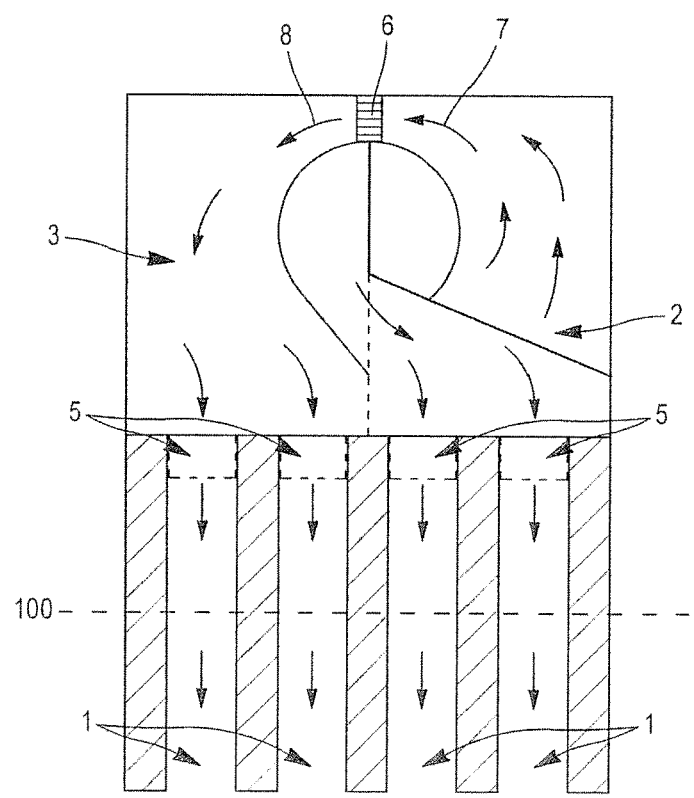
Figure 6A:
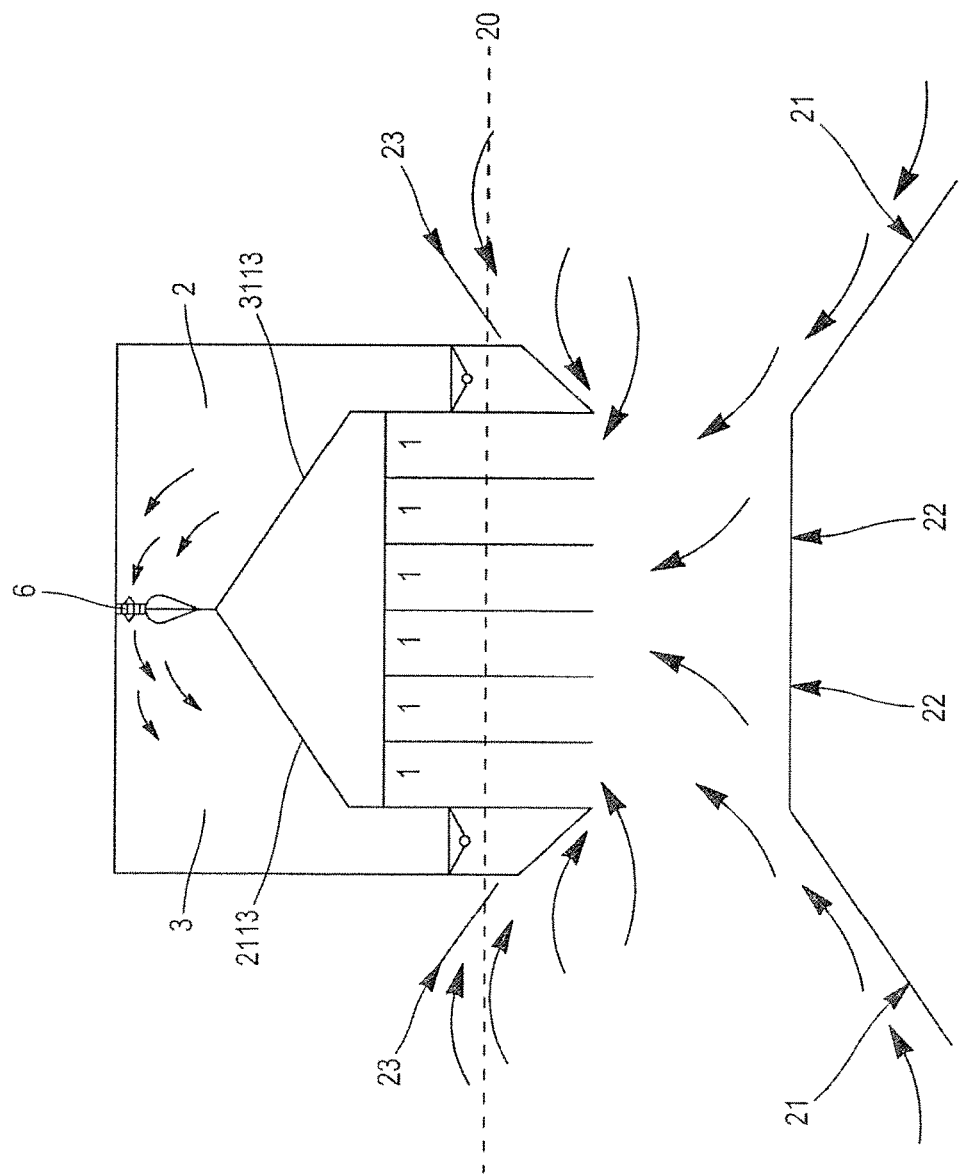
Figure 7:
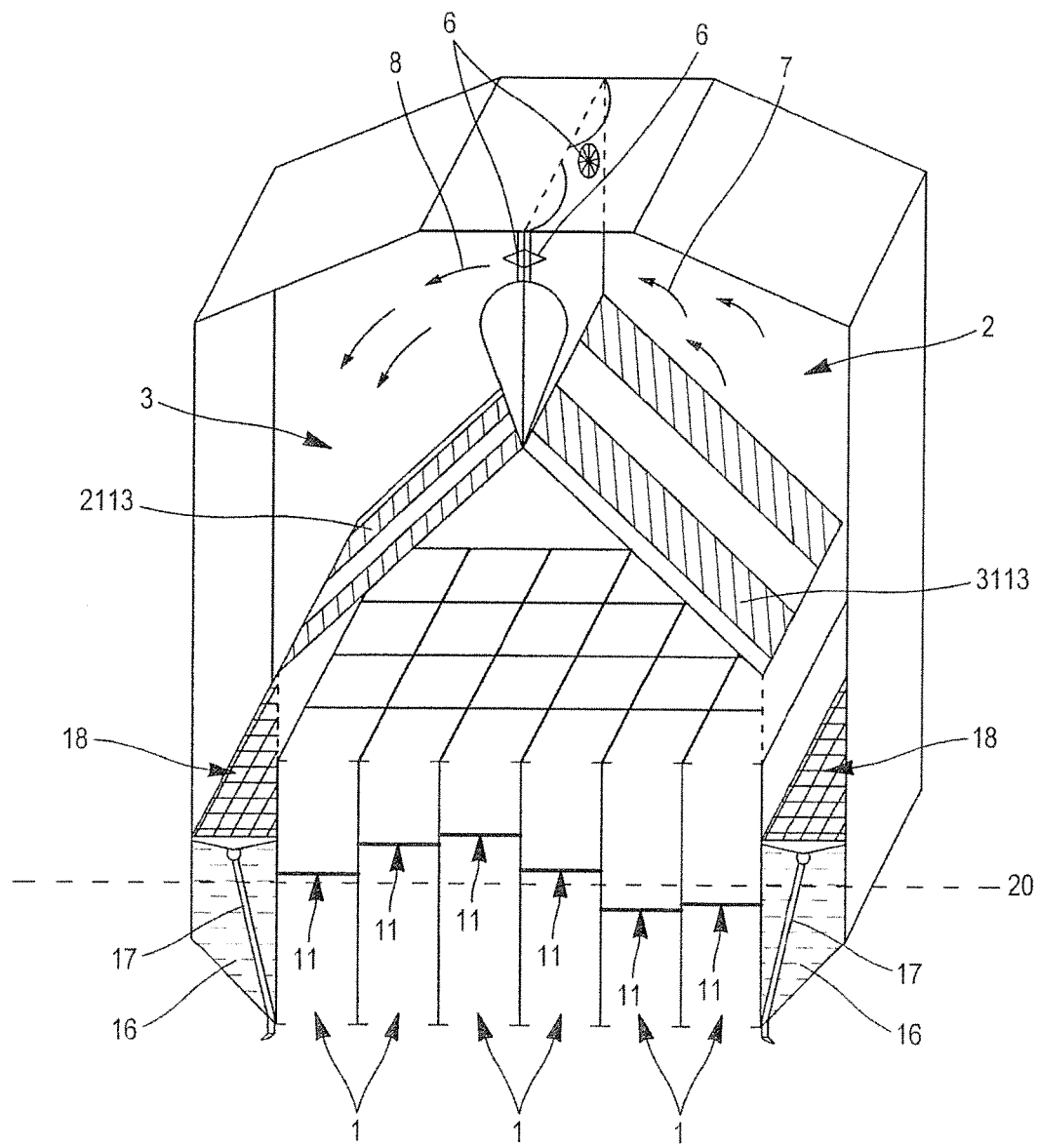
Figure 8:
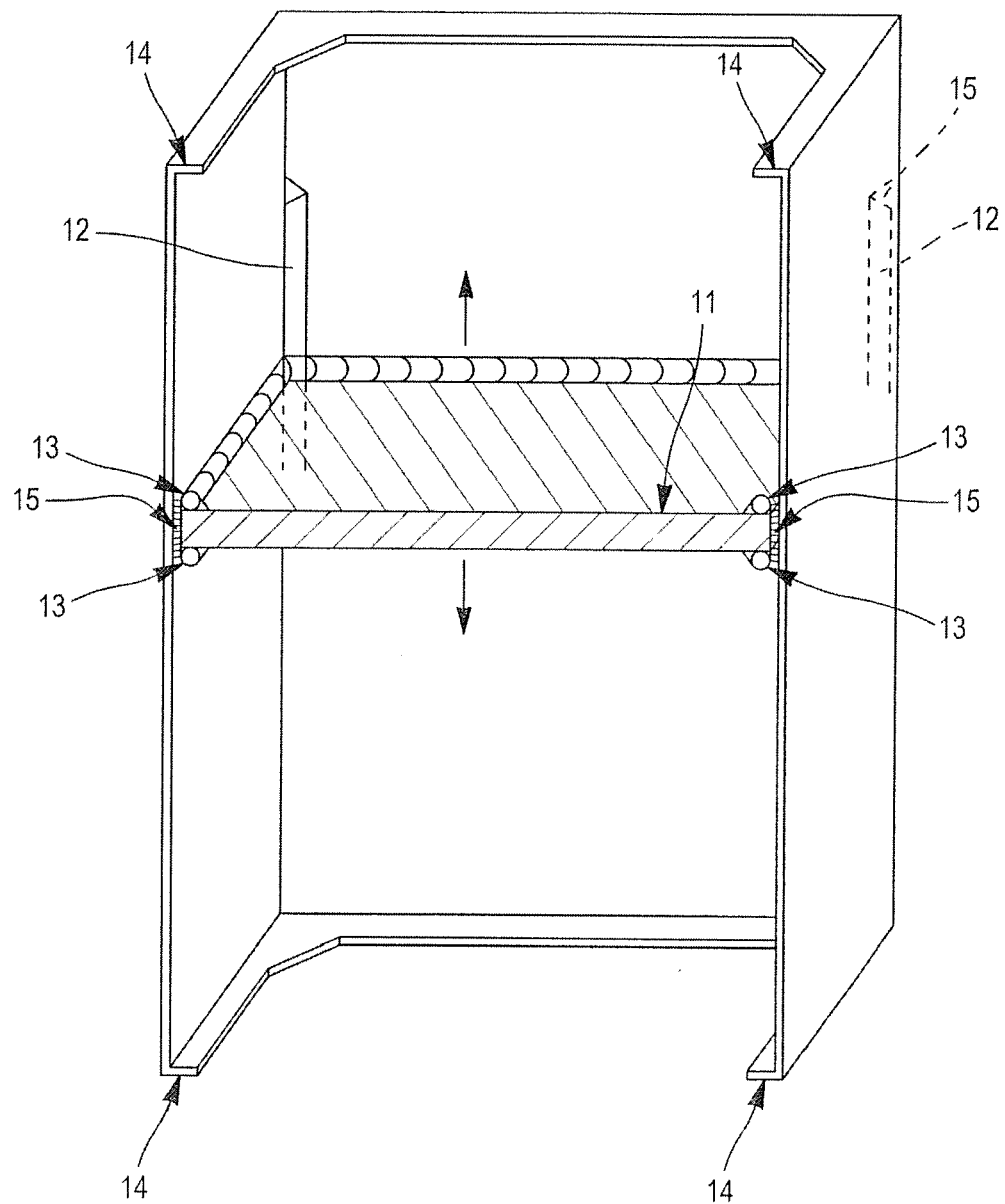
Figure 9:
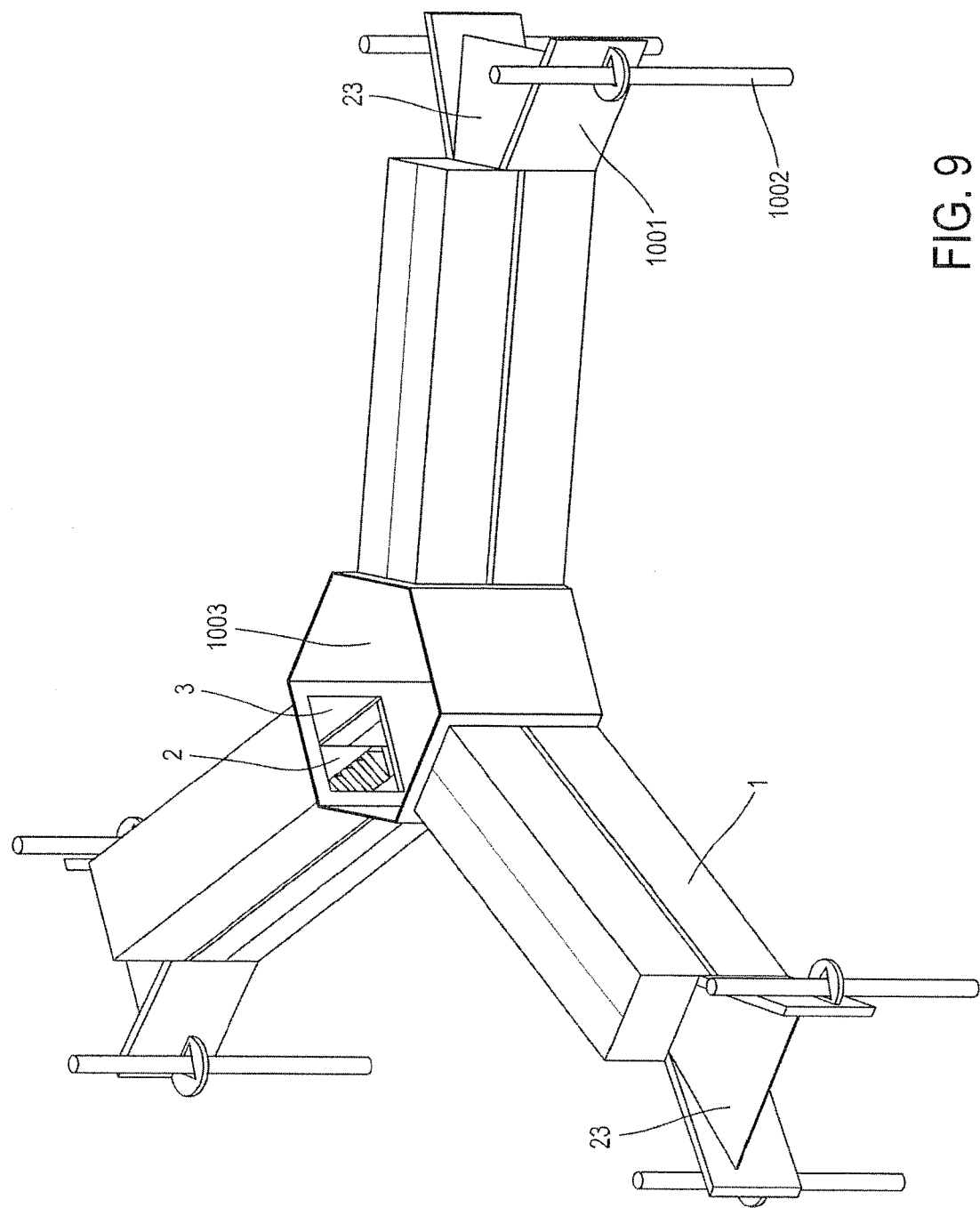

Other goals, features and advantages will appear upon reading the description that follows, given by way of illustration and not limiting, referring to the drawings, of which:

FIG. 1 shows a perspective view of a system according to a first exemplary embodiment of the invention, transparently from one sidewall of the system, FIG. 2 shows a bottom view of the system of FIG. 1, transparently from a roof of the system, FIG. 3 is a bottom section view along a plane D-D of a system according to a second exemplary embodiment of the invention, FIG. 4 shows a side section view along a plane A-A of the system of FIG. 3, FIG. 5a shows a side section view along a plane B-B of the system of FIG. 3, when the water level rises in columns of the system that are shown, FIG. 5b shows a side section view along a plane C-C of the system of FIG. 3, when the water level drops in columns of the system that are shown, FIG. 6a shows a front view of a system according to a third embodiment of the invention, transparently from a side wall of the system, showing means for deflecting the swells in the event of a calm sea, FIG. 6b shows a front view of a system according to the third example of an embodiment of the invention, transparently from a side wall of the system, showing means for deflecting the swells in the event of a rough sea, FIG. 7 shows a perspective view of a system according to a fourth example of an embodiment of the invention, having flotation elements, FIG. 8 shows an internal float device of a column of a system according to the invention according to another particular embodiment of the invention, FIG. 9 shows a perspective view of a unit for converting energy derived from swells, including several systems according to another example of an embodiment of the invention.

DESCRIPTION

General Structure of the System

Referring to FIGS. 1 to 9, it describes a system for converting energy derived from swells and/or from waves.

By swell and/or wave is meant any oscillation of the sea surface, whatever its origin (tide, wind, ships).

In particular, such a system can also allow conversion of the energy derived from random waves which are not directly associated with swells.

The system includes an array of water compression columns 1.

What is meant by column 1 is a hollow structure including one or more side walls extending in a substantially vertical direction between two ends and delimiting in interior space separate from the outside. Each column allows flow of a fluid between its ends.

Each column 1 has a first end, called the lower end 110, designed to be immersed in a volume of water subject to swell action.

The terms "lower" and "upper" will be understood here as terms referring to the relative positions of the elements according to their height, that is according to the altitude relative to a reference level such as the sea level at the location where the system is designed to be positioned and during normal use of the system.

The system is therefore configured such that, in normal use, the lower end 110 of each column 1 is situated below the water level 20.

The lower end 110 has an opening 111 for receiving the water of the water volume in the column 1, so as to form a chamber containing a gas in an upper portion 120 of the column 1.

In this manner, the gas is trapped in the chamber and cannot escape through the opening 111 because this opening is set lower, underwater.

In normal use, the opening 111 is therefore placed underwater. The opening 111 is so configured that the water in the column 1 is subjected to the action of the swell affecting the volume of water.

The gas is typically air.

The upper portion 120, to form a chamber, thus delimits, with the water level inside the column 1, a space wherein the gas can be compressed.

Moreover, the column 1 is so dimensioned that the oscillations of the water can compress the gas, that is effectively amplify a mechanical force acting on the gas, typically by reducing the volume of the chamber wherein it is located.

Now an oscillatory motion such as swells corresponds to a wave that propagates on the surface of the water. This wave forms a spatial sequence of zones where the water level is higher compared to zones where the water level is lower. At a given point on the surface, the oscillation forms a time sequence of periods where the water level rises and times where the water level drops.

Thus, if the side wall of the column 1 is configured so that the water exhibits too high a surface area inside the column 1, there will be zones inside the column 1 where the water level will be higher and zones where the water level will be lower. The effect of one compensating the effect of the other, no compression or suction work will be applied to the gas in the chamber.

The inner space of the columns 1 must therefore be dimensioned so that the water level inside the column 1 is alternately, on average, rising or dropping, that is the volume of the chamber alternately increasing and decreasing. This is possible by choosing inside sections for the columns 1 that are small enough compared to the motion of the swell observed in the region where the system is to be placed.

Of course, a person skilled in the art will know how to so dimension the columns 1, while avoiding reducing their cross-sections too much, which would have the consequence of multiplying the number of columns per surface and reducing the overall efficiency of the system.

Each column 1 has a first check valve 4. This first check valve 4 is in fluid communication from said column 1 to an overpressure vessel 2 common to the columns 1 of the array.

This first check valve 4 is therefore suited to allow the gas situated in the chamber to enter the overpressure vessel 2 when the water level rises in the column 1, subjecting the gas in the chamber to a compressive force. The maximum compressive force is obtained at the peak of the wave.

Moreover, this first check valve 4 makes it possible to avoid having the gas in the overpressure vessel 2 return directly into one of the columns 1, and this regardless of the relative pressures in the different columns 1 and with respect to the overpressure vessel 2.

Each column 1 has a second check valve 5 in fluid communication from a vacuum vessel 3, common to the columns of the array, to said column 1.

This first check valve 4 is therefore suited to allow the gas located in the vacuum vessel 3 to enter the chamber when the water level in the column 1 drops, subjecting the gas in the chamber to a suction force. The maximum suction force is obtained at the trough of the wave.

Moreover, this first check valve 4 makes it possible to prevent the gas in one of the columns 1 from returning directly into the vacuum vessel 3, and this regardless of the relative pressures in the different columns 1 and with respect to the vacuum vessel 2.

All the columns 1 being thus connected to the overpressure vessel 2 and to the vacuum vessel 3, it is possible to obtain an overpressure in the overpressure vessel 2 relative to the vacuum vessel 3.

In the system, the overpressure vessel 2 and the vacuum vessel 3 are fluidically connected by a turbine 6. The pressure difference between the vessels 2 and 3 causes movement of the gas from the overpressure vessel 2 to the vacuum vessel 3 by fluid connection.

The turbine 6 is thus set in motion and can therefore convert the energy received in this manner into another energy type, typically into electrical energy. The system can thus convert energy derived from swells into another energy type.

Moreover, the columns 1 of the array are contiguously arranged. In other words, they are directly adjacent.

What is meant by contiguous is not only the case where the columns 1 share a common wall, or part of a wall, in other words such that each of the two sides of the wall in an inner face of a column 1, but also the case where the walls of the columns 1 are adjoining.

What is meant by adjoining columns 1 is that the respective walls of the columns 1 are in contact with one another, or connected or arranged so as not to allow water to enter the space between two columns 1 placed immediately side-by-side in the array.

What is also meant by adjoining columns 1 is the case where, if a small volume of water can enter this space, this small volume of water cannot be subjected to the swell action and cannot reproduce the oscillatory motion derived from the swell action.

What is more, the array of contiguous columns 1 extends in a least two non-parallel directions, that is it extends in a plane and not only in a single line. At least three columns are therefore not aligned.

The array of columns 1 therefore tends to form a tiling of the water surface.

This can for example be a plurality of lines or alignments of contiguous columns 1. It will however be understood that the present invention is not limited to any geometry in particular.

Thus, in running through the system in any direction of a substantially horizontal plane (typically a plane coinciding with the water surface), at least two columns are encountered in succession. And therefore, whatever the orientation of the system relative to the swells, certain columns 1 are situated at a zone where the water level is higher while others are situated at a zone where the water level is lower (this corresponds in this case to running through the system in a substantially horizontal direction of propagation of the swells). In this manner, the overpressure vessel 2 is supplied with air and the vacuum vessel 3 is emptied at the same time.

Unlike the systems according to the prior art, the system according to the invention still operates continuously when the volume of water is subjected to swell action, regardless of the propagation profile of the swell.

In particular, a gentle swell is sufficient to allow the pressure increase in the overpressure vessel 2 and the pressure drop in the vacuum vessel 3, hence the driving of the turbine 6.

The organization of the array of columns according to the invention thus allows the system to operate, regardless of the nature of the swell. What is more, a system with such an organization of the column array, extending in two non-parallel directions, exhibits greater stability on the water than the prior art systems, and hence continues to operate even in the event of a rough sea or a storm. The system according to the invention is therefore versatile and easily adaptable to variable geographic and climatic configurations.

The result is higher efficiency and a more easily positioned system because it will operate regardless of its orientation with respect to the swell.

Moreover, such a system will not suffer efficiency losses due to diffraction phenomena which would involve the spatial wavelength of the oscillatory motions of the water level being close to the spacing between columns.

Indeed, here the columns 1 are too close together and tend to form a tiling, which prevents all the columns 1 from having the same water level at the same time.

Moreover, this contiguous organization in two non-parallel directions involves a considerable surface of the columns 1 being turned toward the other columns 1 and thus not being exposed to the sea.

The mechanical wear caused by the motion of the water is thus limited to the peripheral zones of the array.

The result is a more robust system than in the prior art. Moreover, this system is easier and less costly to manufacture because only walls of the columns located on the periphery of the array are to be protected against the effects of exposure to the sea.

In addition, the system offers a considerable efficiency because this organization of the columns allows the collection and redistribution of air under pressure to be more effectively organized.

The compactness of the system according to the invention makes it possible to reduce, even to eliminate the great pipe lengths necessary in systems according to the prior art, an obstacle which limits the number of columns which can be connected to the system according to the prior art due to efficiency losses associated with these pipe lengths.

The vessels 2 and 3 can be shared between a greater number of columns and can be positioned and dimensioned so as to pool the routing of air to or from the turbine 6 and to limit the acceleration of the gas and the saturation of the gas flow system at this point in the system, and thus to limit the associated head losses.

While systems according to the prior art were limited to converting energy derived from directional swells, the system according to the invention allows conversion, as a supplement or a replacement, of the energy derived from the entire wave, random or not, whatever its shape and direction.

Array of Columns

Shape of the Columns

The columns 1 can have any shape suited to the implementation of the invention.

The columns 1 have for example a generally cylindrical shape, for example a cylindrical shape extending between their lower end 110 and their upper end.

What is meant by a cylinder is a hollow volume delimited laterally by a surface generated from a straight line, called the generator, having a fixed orientation, and following a closed plane curve called the directrix, the surface being delimited in height, for example, by two parallel planes.

Referring to FIGS. 1 to 6*b*, the columns have for example cylindrical shapes with a rectangular directrix, in other words parallelepiped shapes. The columns can have other cylindrical shapes, for example cylinders of revolution (circular section), tubular shapes or generally prismatic shapes (polygonal cross-section).

The columns 1 are preferably oriented vertically.

The columns 1 can include means for varying the height of the columns. The columns 1 are thus for example columns of variable height. According to one particular embodiment, each column 1 can thus include a telescoping tube and/or a movable cylinder head for raising the column 1 and the system generally. It is thus possible to regulate the water level inside the columns 1.

The columns 1 can have the same shape, as illustrated in FIGS. 1 to 6*b*, or have different shapes.

Column Openings

As illustrated in FIGS. 1 to 6*b*, the opening 111 of the lower end 110 of the columns 1 can be oriented downward.

The opening 111 can be oriented in other directions. For example, the opening 111 can be placed laterally at the columns 1, for example at the columns 1 positioned at the periphery of the array. The opening 111 can also be placed laterally for several columns 1 positioned outside the periphery, particularly if the columns are dimensioned so that their lower ends 110 extend to different heights.

Walls

Referring to FIGS. 1 to 6*b*, certain walls of the columns 1 can be common to several columns.

Alternatively, certain walls of the columns 1 can be placed one against the other or adjacently.

Organization of the Array

The columns 1 can be organized into lines, particularly alignments, for example in several contiguous lines and/or rows.

What is meant by a line is a line of contiguous columns 1. The lines are for example curved lines or straight lines, or alignments in other words.

Referring to FIGS. 1 to 6*b*, the columns can in particular be organized into rectilinear and mutually parallel alignments. The array can then extend in two orthogonal directions, so as to form a grid of columns 1 over the water surface.

Alternatively, the columns 1 can be organized into lines which are not straight, for example into curves, for example along concentric curves.

The columns 1 and the array can be dimensioned according to the characteristic wavelength of the swell. Thus it is possible to select a cross-section of the columns 1, a height of the columns 1, and a type of line for the array suited to a certain type of swell, that is to a certain segmentation of the waves to optimize the efficiency of the system.

Check Valves and Vessels

Valves

For each column 1, the first check valve 4 and/or the second check valve 5 can be positioned above the column 1.

Alternatively, one or more valves can be positioned laterally, particularly for the columns located on the periphery of the array, or for columns 1 which are not situated on the periphery if the ends of these columns 1 extend to different heights than the contiguous columns 1.

Organization of the Valves and of the Vessels

The first check valves 4 of the columns 1 of the system are for example positioned along first lines, alignments for example. The second valves 5 of the columns 1 of the system are for example aligned along second lines, alignments for example.

What is meant by a line is, geometrically, a continuous trace connecting elements. The line can for example be straight or curved.

Arrangement along the lines typically involves that the different lines must not cross one another, in other words that the elements of one line cannot be positioned on both sides of another line. The crossing can be defined with respect to a projection in a plane, typically a projection in a plane defined by the mean surface of the water.

A line of valves 4 or 5 is typically a line of valves 4 or 5 of contiguous columns 1.

A line of valves 4 or 5 can be a line of contiguous valves 4 or 5, particularly if the valves 4 or 5 are arranged differently from the corresponding columns 1.

The check valves are for example flapper valves.

Such lines or alignments make it possible to reduce the total volume of the structure and to more effectively interconnect the valves so as to reduce losses connected with the collectors.

The lines or alignments of valves 4 and/or 5 can be rectilinear and mutually parallel, as illustrated in FIGS. 1 to 6*b*.

The valves 4 and 5 can form an alternation of first lines and of second lines above the columns 1.

In particular, each first line can be positioned at a first portion 210 of the overpressure vessel 2 and each second line can be positioned at a second portion 310 of the vacuum vessel 3. The first portions and second portions can then be arranged alternately above the columns 1.

A structure is then obtained wherein, as illustrated by FIGS. 1 to 6*b*, the vessels 2 and 3 are interlaced above the columns 1. The portions of the vessels 2 and 3 positioned alternately can be separated by common walls.

Thus it is possible to directly connect each column 1 to each of the vessels 2 and 3 without resorting to collectors at the valves 4 and 5 for each line or alignment, or to sharply limit the lengths of the collectors needed and thus to limit thereby the losses associated with such collectors.

The first portions can exhibit forms with increasing cross-sections in the gas flow direction. Likewise, the second portions can exhibit forms with decreasing cross-sections in the gas flow direction. It is thus possible to avoid the limitation of gas flow particularly due to back-pressure in the vessels 2 and 3 in proximity to the valves, and thus to limit head losses.

What is more, all the valves are not necessarily open at the same time in one and the same portion. This further reduces the risks of acceleration or of saturation of the gas flow compared to dedicated collectors at each valve.

In particular, the first portions 210 can each be connected to one and the same first chamber 220 of the overpressure vessel 2, the first chamber being positioned between each first portion 210 and the turbine 6.

The second portions 310 can each be connected to one and the same second chamber 320 of the over pressure vessel 2, the second chamber being positioned between each second portion 310 and the turbine 6.

What is meant by connected is a fluid connection, typically a direct fluid connection, typically that each portion leads directly to the corresponding first or second chamber.

Each vessel 2 or 3 can then include a portion having the general shape of a comb, the portions forming the teeth of the comb and the first or second chamber forming the handle of the comb. The combs of the two vessels 2 and 3 are then inserted into one another at their teeth. There results a considerable space saving, and thus a reduction in the costs of production of the structure as well as a reduction in losses.

The first chamber 220 or the second chamber 320 is typically an arm. What is meant here by an arm is a portion of the vessel that is extended so that the corresponding portions lead into it.

The first chamber 220 can have a form with an increasing cross-section in the gas flow direction.

In particular, the first chamber 220 can have a shape with a cross-section greater than the sum of each cross-section of an opening positioned upstream, each opening corresponding to a first portion 210 leading into the first chamber 220 upstream of the section.

Thus, typically, when the first portions 210 have an increasing cross-section, the first chamber 220 can have a shape with a cross-section greater than the sum of the maximum cross-sections of each first portion 210 leading into the first chamber 220 upstream of the section.

Likewise, the second chamber 320 can have a form with a decreasing cross-section in the gas flow direction.

In particular, the second chamber 320 can have a shape the cross-section whereof is greater than the sum of each cross-section of an opening positioned downstream, each opening corresponding to a second portion 310 leading into the second chamber 320 downstream of the section.

Thus typically, when the first portions 210 have an increasing cross-section, the first chamber 220 can have a shape with a cross-section greater than the sum of the maximum cross-section of each first portion 210 leading into the first chamber 220 upstream of the section.

It is thus possible to avoid limitation of the gas flow, particularly due to a back-pressure between the portions of the first 220 and second 320 chambers of one and the same vessel, and hence to limit head losses.

The first chamber 220 and/or the second chamber 320 can each form a gas and/or pressure reservoir. When the turbine 6 operates at saturation, it is thus possible to store the overpressure in the overpressure vessel 2 and the vacuum in the vacuum vessel 3 so that the turbine 6 can continue to operate even if the swell and the waves supply less energy later on.

In particular, the first chamber 220 can be positioned above the alternation of first portions 210 and of second portions 310.

Likewise, the second chamber 320 can be positioned above the alternation of first chamber 210 and of second chambers 310.

The result is still greater compactness of the system.

Another result is a lower production cost, because it is possible to use common walls between the portions of a vessel 2, respectively 3, and the second chamber of the other vessel 3, respectively the first chamber of the other vessel 2, as in the embodiments illustrated in FIGS. 1 to 6b, wherein the upper walls of the sections of a vessel 2, respectively 3, form portions of lower walls of the other vessel 3, respectively 2.

Likewise, a portion of side wall of the vessels 2 and 3 can be common to the two vessels 2 and 3. It can then be advantageous to place one or more turbines at the common wall portion, as illustrated in FIG. 1, and thus to create an even more compact system and to limit the losses associated with ducts for routing gas to the turbine 6.

Alternatively, the first chamber 220 and/or the second chamber 320 can be positioned on either side of the alternation of first portions 210 and of second portions 310.

When the first chamber 220 and the second chamber 320 are positioned on either side of the alternation of first portions 210 and of second portions 310, it is possible to obtain a lower, and therefore more stable, structure.

Whether the first chamber 220 and the second chamber 320 are positioned on either side of or above the portions 210 and 310 of the vessels 2 and 3, the turbine 6 can be positioned between the two ends of the arms, as illustrated in FIG. 3.

Whatever the position of the first chamber 220 and of the second chamber 320, it is possible to dimension these chambers of the vessels 2 and 3 so as to form choke points in proximity to the turbine 6 only. These choke points make it possible to accelerate the air at the passage into the turbine 6 and to increase the efficiency by allowing smooth flow of the air, even in the event of a gentle swell.

According to one particular embodiment, each first portion 210 includes two first lines in succession and each second portion 310 includes two second lines in succession.

A structure is then obtained for which the valves are placed head-to-foot from one line to another, or from one alignment to another, as illustrated in FIG. 3.

This makes it possible to obtain a structure that is even less costly to produce because each section includes two lines or alignments.

An additional advantage of such an embodiment is to avoid losses connected with phase shift of the wave of the swell, and even to benefit from it, even if the propagation wave is parallel to the lines or alignments.

Indeed, all the valves of the same type being organized in two successive lines, or successive alignments, of contiguous columns, particularly if the water is subjected to a wave propagating parallel to the lines, particularly to the alignments, the columns can be so dimensioned that at least one of the two lines, particularly alignments, has open valves. Each section therefore has a much greater probability of having gas flowing through it at a given time and that the gas flows are more equitably distributed between the different portions of the vessels 2 and 3.

What is more, the space made available for the gas flow by the section associated with a line or an alignment being pooled between the lines or alignments in pairs, and the valves of each line or alignment not all being systematically opened at the same time, it is thus possible to save even more space during gas flow from or to each check valve 4 and/or 5 and to further reduce the acceleration of the gas and the possibilities of saturation of the gas flow.

Internal Float of a Column

According to one particular embodiment, one or more columns, preferably all the columns, of the structure, have a float device 11 internal to each column 1. Such a device, typically including an internal float 11, is for example illustrated in FIG. 8.

The internal float 11 is typically dimensioned to be sufficiently light to float on the water present in the column. Thus the internal float can be dimensioned to move in the column while being carried by the water in the column, at least between a low position at a first height and a high position at a second height.

The movement of the internal float can be guided by guiding means located in the column 1. The guiding means can include a guide.

The guiding means limit for example the movement of the internal float between the high position and the low position.

It is thus possible to avoid having the internal float leave the column 1.

Alternatively or additionally, the guiding means make it possible for example to limit the movement of the internal float in other degrees of freedom, for example to avoid having the internal float tilt or turn and becoming blocked along the tunnel.

According to one example of an embodiment, the guiding means include rails extending along an inner wall of the column 1, the internal float having complementary element such that the internal float moves along the rails.

The rails can thus be shaped so as to restrict the movement of the internal float between the high position and the low position, for example by means of stops.

The internal float is for example designed to level the water level inside the column. Differences in the water level in one and the same column, which tend to cause perturbations of the flow in one and the same column 1, due among other things to resonance phenomena resulting in pressure losses, are thus avoided. To this end, the internal float has for example a form generally complementary to the inner cross-section of the column 1, with reduced dimensions to allow clearance.

The internal float is for example designed to prevent the water from entering the valves from the column.

This makes it possible to avoid having the water enter the vessels 2 and/or 3, and cause a drop in the buoyancy of the system and/or the system efficiency.

Moreover, this makes it possible to avoid having too great a force exerted by the water damage the valves. Indeed, in order to obtain considerable effectiveness and reactivity, the valves are preferably dimensioned so as to react with great sensitivity to the pressure exerted by the air. Such sensitivity, however, implies that forces exerted by a liquid such as water threaten to do considerable damage to the valves. When sensitive valves are installed, it is therefore desirable to protect them.

To this end, the column has for example an upper stop zone 14, of complementary shape to the internal float, at the second height, extending from the inner wall of the column, and wherein the internal float embeds itself when it is moved up to this structure so as to form a sealed closure at this location. Thus, when the water rises until the internal float embeds itself in upper stop zone, the water cannot rise further and will therefore be unable either to enter the vessel 2 or 3, or to damage the valves positioned above the stop zone.

The upper stop zone includes for example a sealed gasket against which the internal float presses so as to form a sealed closure.

The upper stop zone can be adapted to form a damper and thus to limit wear on the float due to its consecutive impacts against the stop zone. Alternatively or additionally, a damping element 13 can be placed on the float 11.

Alternatively or additionally, the internal float is for example adapted to prevent air from escaping from the column through the opening 111.

This makes it possible to avoid having gas leave the system when the water level drops, causing a vacuum in the column and a suction tending to drive the air toward the outside of the system through the opening 111, in particular when the level of the waves drops sufficiently to reach the opening 111. A reduction in the quantity of gas in the system would gradually reduce the efficiency in the system.

To this end, the column has for example a lower stop zone, complementary in shape to the internal float, at the first height, extending from the inner wall of the column, and wherein the internal floater embeds itself when it is moved by the water with a dropping level down to this structure so as to form a sealed closure at this location. Thus, when the water drops in the column until the internal float embeds itself in the lower stop zone, the gas remains in the column above the first height, and thus cannot escape from the system.

The lower stop zone includes for example a sealed gasket against which the internal float presses so as to form a gas-tight closure.

The lower stop zone can be adapted to form a damper and thus to limit the wear on the float due to its successive impacts against the lower stop zone. Alternatively or additionally, a damping element 13 can be positioned on the float 11.

Alternatively, the internal floater can be adapted to move within the column and have means 15 for cleaning side walls of the column.

A recurring problem for systems in contact with water is the formation of marine biofilms. The latter tend to damage the contacting walls on which they develop.

What is more, cleaning of the columns 1 can be complex to implement, and its conventional implementation would require stopping the operation of the column 1, or possibly of the entire system, which implies that no energy is converted during that period.

The movement of the internal float 11 with the oscillatory motion of the water in the column 1 can thus make it possible to clean the column and to prevent the formation of biofilms.

Moreover, this cleaning takes place continuously when the system is in normal operation, and thus avoids stopping the system to clean the columns.

The internal float can thus include on its periphery elements such as brushes and/or scrapers which rub against the inner wall of the columns and tear off the films that develop there.

Pressure Regulator

According to one particular embodiment, the system includes a pressure regulating device.

The pressure regulating device is designed to adjust the sum of the pressure in the overpressure vessel 2 and the pressure of the vacuum vessel 3 relative to the atmospheric pressure.

The pressure regulating device is designed to adjust the mean of the overpressure vessel 2 pressure and the vacuum vessel 3 pressure with the atmospheric pressure.

The pressure regulating device includes for example two pistons positioned in two chambers to compare pressures in pairs.

The pressure regulating device includes for example a double piston positioned in a chamber. The double piston includes two pistons sealingly separating the chamber into three parts.

Each piston is for example movable independently of the other piston in the same chamber, of which one end portion and one portion between the pistons are each in fluid connection with one of the two vessels 2 and 3 through connection means. Another end is in fluid connection with the outside through connection means. The connection means are ducts, for example.

The regulating device can be arranged in such a way that the three parts of the chamber have respectively the pressure in the vacuum vessel 3, the overpressure vessel 2 and atmospheric pressure.

Thus the position and the movement characteristics of the pistons depend on the difference between these pressures.

The pistons can be capable of actuating valves depending on their position and their movement, so as to aspirate some outside air into the vacuum vessel 3 when the sum of the pressures of the two vessels 2 and 3 is less than the product of the atmospheric pressure and a fixed coefficient.

Likewise, the pistons can be capable of actuating valves depending on their position, so as to allow some air in the overpressure vessel 2 to escape when the sum of the pressures of the two vessels 2 and 3 is greater than the product of the atmospheric pressure and a fixed coefficient.

Water Drainage Device

According to one particular embodiment, the overpressure vessel 2 and/or the vacuum vessel 3 can include water drainage means 17, for example a water drainage device.

The water drainage device of a vessel 2 or 3 is for example positioned in a low portion of the vessel 2 or 3, so that the water is directed to it by gravity. The water drainage device can be positioned at an end of the vessel 2 or 3 near the periphery of the system.

The water drainage device of a vessel 2 or 3 includes for example a tube connected to a check valve.

The tube extends for example at a height less than that of the columns 1. In this manner, when the water level drops in proximity to a low end of the tube, for example due to passage of the trough of a wave at a low end, the interplay of pressures induces water to escape without gas leakage and therefore without pressure loss. Such a configuration makes it possible for example to empty the tube of the vacuum vessel 3 where the internal pressure tends to prevent water from leaving the tube.

The water drainage device is for example a dump valve type system.

Such devices are illustrated for example in FIG. 1.

Swell Deflector

According to one particular embodiment, the system can include means for deflecting the swell.

These deflection means are for example designed to concentrate the swell toward the openings 111 of the columns so as to increase the oscillations of the water in the columns 1.

These deflection means are for example designed to limit the concentration of the swell directed toward the openings 111 of the columns 1 so as to reduce the oscillations of the water in the columns 1 in the event of a disturbed sea and to thus protect the interior of the system, for example the valves of the columns 1.

The deflection means can be fixed, or movable between at least two positions to allow concentration of the swell directed toward the openings 111 in the event of a calm sea and/or to limit the swell directed toward the openings 111 in the event of a rough sea or a storm.

The deflection means can include at least one deflector.

The deflection means can include at least one wall or baffle, fixed or movable, positioned on the system, for example on an outside baffle of the system, to orient the swell downward, that is toward the openings 111 in the columns.

The deflection means can include at least one baffle, fixed or movable, positioned below the openings 111 when the system is in normal operation, to orient the swell upward, that is toward the openings 111, and/or to limit access to the openings 111.

The effect of the deflection can thus be modulated, when the baffle is movable, according to the position of the deflectors positioned below the openings 111, in particular according to their orientation and to their heights with respect to the lower portions of the columns.

Thus the movable baffles positioned below the openings 111 are for example placed on the bottom, or connected to the system by means of cables, for example cables of a length that can be modulated to change the effect of the movable baffles on the swell.

Examples of movable baffles are for example provided in FIGS. 6a and 6b.

System Flotation Element

The system can include flotation means 16 so as to maintain the system at a certain level in the water volume.

These flotation means typically include floats.

Energy Conversion Unit

A unit for converting energy derived from swells is also described.

Such a unit includes a plurality of interconnected systems. The systems are for example interconnected at a central part 1003, this central part possibly including turbines 6 common to the different systems.

Preferably, the systems are interconnected so as to form angles other than 180°, preferably also 90° so as to optimize energy conversion regardless of the propagation direction of the swell.

Such an organization also makes it possible to avoid system movement phenomena, typically pitching and/or rolling of the systems, under the influence of the swell and of waves. These phenomena are to be avoided because they reduce the efficiency of the systems. Indeed, the swell and the waves in general can move the system, which then reduces the oscillations inside the columns 1 and hence the energy which can be converted.

Typically, a plurality of systems, at least three systems, are thus interconnected, forming equal angles between them, for example 120°.

EMBODIMENT EXAMPLES

First System Example

Referring to FIGS. 1 and 2, a system according to a first exemplary embodiment of the invention is described.

The system includes columns 1 organized contiguously, for example in a grid, the columns 1 preferably sharing walls with contiguous columns. The grid includes for example four lines of seven columns 1 each.

The columns 1 are preferably oriented vertically. The columns 1 for example have rectangular sections, typically on the order of 0.5×0.7 m for a height of 2.2 m.

The top of the columns (not shown) is typically closed and provided, for each column with a first check valve 4 and with a second check valve 5, each check valve communicating with a portion 210 or 310 of the corresponding vessel 2 or 3.

Preferably, as illustrated in FIG. 2, each first portion 210 of overpressure vessel 2 and each second portion 310 of vacuum vessel 3 extends partially above the two adjoining lines of columns 1, such that the check valves 4 and 5 of the same type of the columns of the two lines are connected to the same portion. Thus, two lines of first check valves 4 corresponding to two lines of adjoining columns 1 are for example connected to the same first portion 210.

The result is that the lines or alignments of check valves are provided head-to-foot between one line or alignment of columns 1 and the adjoining line or alignment.

The overpressure vessel 2, respectively the vacuum vessel 3, preferably each exhibits a first chamber 220, respectively a second chamber 320, extending above the first portions 210 and second portions 310.

The vessels 2 and 3 are for example separated by a wall 610. The wall extends for example extending orthogonally to the grid of columns 1 and is positioned substantially in the center of the system.

The wall 610 is typically provided with at least one turbine 6 allowing gas flow between the overpressure vessel 2 and the vacuum vessel 3.

Thus, each first portion 210 of overpressure vessel 2 includes a distal sub-portion 211 positioned below the second chamber 320 of the vacuum vessel 3 and a proximal sub-portion 212 positioned below the first chamber 220 of the overpressure casing 2 and directly connected to the first chamber 220 of the overpressure vessel 2.

Likewise, each second portion 310 of overpressure vessel 3 includes a distal sub-portion 311 positioned below the first chamber 220 of the overpressure vessel 2 and a proximal sub-portion 312 positioned below the second chamber 320 of the vacuum vessel 3 and directly connected to the second chamber 320 of the vacuum vessel 3.

Thus, each distal sub-portion 211 of the overpressure vessel 2 is separated from the adjoining proximal sub-portions 312 of the vacuum vessel 3, typically by side walls 2111 and 2112.

Likewise, each distal sub-portion 311 of the vacuum vessel 3 is separated from the adjoining proximal sub-portions 212 of the overpressure vessel 2, typically by side walls 3111 and 3112.

In addition, each distal sub-portion 211 of the overpressure vessel 2 is separated from the second chamber 320 of the vacuum vessel 3, positioned above it, by an upper wall 2113 connected to the side walls 2111 and 2112 such that the distal sub-portion 211 is hermetically isolated from the vacuum vessel 3.

Likewise, each distal sub-portion 311 of the vacuum vessel is separated from the first chamber 220 of the overpressure vessel 2, positioned above it, by an upper wall 3113 connected to the side walls 3111 and 3112 such that the distal sub-portion 311 is hermetically isolated from the overpressure vessel 2.

Preferably, the upper walls 2113 and 3113 are tilted with respect to the line or the alignment of the valves 4 or 5, so as to form a sub-portion with an increasing or decreasing cross-section and to take into account the summation or the subtraction of the flows directed toward the valves 4 or 5 or derived from valves 4 or 5, along the sub-portions.

The walls between the columns 1 and between the sub-portions and the first chamber 220 and the second chamber 320 typically have thicknesses between 1 and 3 mm.

The overpressure vessel 2 and the vacuum vessel 3 can moreover be isolated from the outside by side walls and walls forming a roof.

The vessels also extend over the columns 1, so as to provide a maintenance corridor 18 on either side of the columns in each of the vessels.

Second System Example

Referring to FIGS. 3 to 5b, a system according to a second embodiment example of the invention is described.

The relative organization of the columns 1, the check valves 4 and 5 and the vessels 2 and 3 is similar to that of the first example.

The columns 1 wherein the water level is minimum relative to the mean level 20, because the trough 10 of the wave is passing them, are subjected to a vacuum force.

The columns 1 wherein the water level is maximum relative to the mean level 20, because the peak 10 of the wave is passing them, are subjected to a compression force.

The distribution of the first check valves 4 in direction and of the second check valves 5 above the columns 1 is highlighted.

However, the turbine 6 is positioned in a choke point formed on either side of the turbine 6 by the overpressure vessel 2 and by the vacuum vessel 3. This choke point makes it possible to accelerate the flow of gas solely at the turbine 6 in order to provide for better efficiency. This choke point can be made as an extension of the first chamber 220 and of the second chamber 320.

The arrows 7 show the flow of gas entering the turbine 6 and the arrows 8 show the flow leaving the turbine 6.

The check valves 4 and 5 include for example flappers designed to rock depending on the circulation direction allowed by each valve.

The first check valves 4 are for example positioned on the side walls 3111 and 3112 of the distal sub-portions 311 of the second portions of the vacuum vessel 3, as illustrated in FIG. 4, and/or on the walls of the columns 1.

Likewise, the second check valves 5 are for example positioned on the walls of the columns 1, as shown in FIG. 4, and/or on the side walls 2111 and 2112 of the distal sub-portions of the second portions of the vacuum vessel 3.

Third System Example

Referring to FIGS. 6a and 6b, a system according to a third example of an embodiment of the invention is described.

The relative organization of the columns 1, the check valves 4 and 5 and the vessels 2 and 3 is similar to that of the first example.

The system can include means for deflecting the swell. In particular, the system can include one or more upper lateral baffles 23 positioned for example at the water surface 20. The upper lateral baffles 23 are positioned on either side of the system.

The system includes for example, additionally or alternatively, baffles positioned below the water surface 20.

Thus the system includes for example lower central baffles 22 positioned below the array of columns 1. The system includes for example lower lateral baffles 21 positioned below the upper lateral baffles 23.

The baffles can be fixed. They are then adapted to a possible configuration. Preferably, the baffles are movable for adapting the deflection of the swell to the profile of the swell to which volume of water is subjected at a given time.

When the sea is normal, that is when the height of the swell is suited to the dimensions of the columns 1, to their height in particular, to obtain a desired efficiency all the baffles are arranged in a neutral position, typically horizontally, so as not to change the swell.

When the sea is calm, when the height of the swell is too low relative to the dimensions of the columns 1, the baffles can taken on a convergent orientation with respect to the lower portion 110 of the columns 1. The baffles then allow concentration of the swell in the columns 1 and increase the amplitude of the oscillations of the water in the columns. Indeed, in calm water, it is necessary to increase as much as possible the movements of the swell so as to improve efficiency.

This can for example be obtained with the system shown in FIG. 6a. The upper lateral baffles 23 are for example oriented so as to direct the swell downward. Outside walls of the system can have a similar orientation to boost the movement of the swell in the direction supplied by the upper lateral baffles 23.

The lower lateral baffles 21 are for example oriented symmetrically to direct the swell upward. The lower central baffles 22 can then be placed horizontally so as not to block the movement of the swell.

When the sea is rough or during a storm, if the height of the swell is too great relative to the height of the columns 1, the baffles can assume a divergent orientation with respect to the lower portion 110 of the columns 1. The baffles then allow partial dispersion of the energy of the swell initially directed toward the columns 1 and thus reduces the amplitude of the oscillations of the water in the columns 1. Indeed, in a rough sea, it is necessary to reduce the movements of the swell so as to avoid damaging the system.

This can be obtained, for example, with the system shown in FIG. 6b. The upper lateral baffles 23 are for example oriented to direct the swell upward, that is against the walls of the system and not under the walls.

The lower lateral baffles 21 are for example oriented symmetrically with respect to the flotation level 20, approaching a vertical direction to direct the swell downward. The lower central baffles 22 can then be placed in a similar manner to direct the swell downward.

Fourth System Example

Referring to FIG. 7, a system according to a fourth example of an embodiment of the invention is described.

The relative organization of the columns 1, of the check valves 4 and 5 and of the vessel 2 and 3 is similar to that of the third example.

The vessels 2 and 3 preferably extend beyond the columns 1, so as to provide a maintenance corridor 18 on either side of the columns in each of the vessels 2 and 3. This maintenance corridor allows a person for example to enter the vessels 2 and/or 3 to carry out repairs, cleaning or any sort of maintenance.

The system can include one or more flotation elements 16 so as to improve its flotation capacity.

These flotation elements 16 are for example positioned on either side of the system, for example in a lower portion of the system, for example below the maintenance corridors 18.

Moreover, the system can include means 17 for removing water from the vessels 2 and/or 3. The water drainage means 17 can includes a water drainage device such as a dump valve.

The water drainage device 17 can be positioned at the maintenance corridor 18, for example in the form of a water drain positioned in the maintenance corridor 18. The water drainage device 17 can include a tubular element which for example passes through the flotation element 16.

Moreover, the system can include a plurality of turbines 6.

The wall in proximity to the turbine 6 preferably has a shape suited for directing the gas flows toward the turbine 6.

Example of a Float Device Internal to a Column

Referring to FIG. 8, a column 1 of a system according to the invention is described, including a float device 11 internal to column 1.

The internal float 11 has a shape suitable for moving along the column 1.

The internal float 11 typically includes a membrane or wall designed to cover the major part of the surface of the water in the column 1, so as to level that surface.

Moreover, the shape of the internal float 11 is typically designed for hermetically closing the column 1 when the float comes into contact with an upper or lower stop zone 14.

The internal float 11 includes for example at least one damping element 13 to limit the shock when encountering one of the stop zones 14. This damping element takes for example the form of a bump projecting from the internal float 11 at its perimeter.

Movement of the float is typically limited by guiding means 12, typically rails 12 along which the float 11 moves.

The float can include, at the edges, means 15 for cleaning the side walls of the column 1. These means typically include brushes 15. The rails 12 can also have brushes which are actuated by passage of the float.

The column 1 is typically cylindrical, with a rectangular cross-section.

Energy Conversion Unit Example

Referring to FIG. 9, a unit is described for converting energy derived from swells or waves.

The unit includes a plurality of interconnected systems according to the invention. For example, the unit includes three systems interconnected at one of their ends by a central part 1003.

The other end can have swell deflection baffles 23 and 1001.

The unit can float, and be limited in its movements by means of guides 1002, typically posts.

The central part 1003 can contain turbines 6 common to the different systems.

Numerical Example

Let a system according to the invention have columns 1 with cumulative cross-section of 1000 m$^2$, positioned outside the seawalls of Saint Jean de Luz and subjected to winter swells.

This swell has a swell height H of 2 m and a period T of 7 s.

Let $H_a$ be the mean height of the swell after damping by the system, with damping overestimated at 30%.

$$H_a=1.4 \text{ m}$$

Let $dP_{max}$ be the difference in pressure between the maximum overpressure and the maximum vacuum at the OWCs.

$$dP_{max}=2 \cdot dP_{Ha}=28{,}000 \text{ Pa}$$

Let $dP_u$ be the variation in usable pressure to taking into account the aerodynamic head losses.

$$dP_u=dP_{max}-10\%=25{,}200 \text{ Pa}$$

Let $V_{max}$ be the maximum speed of the air with an air mass density $\rho$ of 1.20 kg/m³ at 15 wet degrees.

$$V_{max}=(2 \cdot dP_u/\rho)^{1/2}=205 \text{ m/s}$$

Let $D_{max}$ be the maximum flow rate.

$$D_{max}=H_a \cdot S/T=285 \text{ m}^3/\text{s}$$

Let V be the maximum speed of the air in the turbine with a practical turbine cross-section S of 1.4 m².

$$V=D_{max}/S=203 \text{ m/s}$$

Therefore $V<V_{max}$ holds true.

By using the Betz formula, the maximum theoretical power is deduced from it:

$$P_{max}=\tfrac{1}{2} \cdot \rho \cdot S \cdot V^3=7{,}026{,}958 \text{ W}$$

In certain zones, by observing available meteorological data, it is observed that these conditions are found together more than 95% of the time, that is more than 8300 hours per year.

The result is a theoretical maximum potential production of about 58,000 MWh/y (or 58 GWh) for 1000 m² of collectors.

With such a theoretical efficiency, about 9 km² of column area would be needed to supply 520 TWh per year, namely the total current electrical power consumption of France.

Considering a practical efficiency of 25%, 36 km² of area would be needed, or 3600 systems or units according to the invention of 10,000 m² total area, distributed for example in 36 pools of 100 systems or units.

The invention claimed is:

1. A system for converting energy derived from swell or from waves, including an array of water compression columns, each column having:
    a lower end designed to be immersed in a volume of water undergoing swell action, the lower end having an opening to receive the water from the water volume into the column, so as to form a chamber containing a gas in an upper portion of the column,
    a first check valve in fluid communication from each said column to an overpressure vessel shared by the columns of the array,
    a second check valve in fluid communication from a vacuum vessel shared by the columns of the array, wherein the overpressure vessel and the vacuum vessel are fluidically connected by a turbine,
    wherein the first check valves of the columns of the system are positioned along first lines, and the second check valves of the columns of the system are positioned along second lines,
    wherein the valves form an alternation of first lines and second lines above the columns,
    wherein each first line is positioned at a first portion of the overpressure vessel and each second line is positioned at a second portion of the vacuum vessel, the first portions and second portions being positioned alternately above the columns,
    wherein the first portions are each connected to one and the same first chamber of the overpressure vessel, positioned between each first portion and the turbine, and the second portions are each connected to one and the same second chamber of the vacuum vessel positioned between each second portion and the turbine.

2. The system according to claim 1, wherein, for each column, the first check valve and the second check valve are positioned above the column.

3. The system according to claim 1, wherein the lines are mutually parallel rectilinear alignments.

4. The system according to claim 1, wherein the first portions are each connected to one and the same first chamber of the overpressure vessel, positioned between each first portion and the turbine, and the second portions are each connected to one and the same second chamber of the vacuum vessel positioned between each second portion and the turbine.

5. The system according to claim 4, wherein the first chamber and the second chamber are positioned above the alternation of first portions and of second portions.

6. The system according to claim 4, wherein the first chamber and the second chamber are positioned on either side of the alternation of first portions and of second portions.

7. The system according to claim 4, wherein the first chamber, respectively second chamber has an increasing, respectively decreasing cross-section in the gas flow direction.

8. The system according to claim 7, wherein:
    the first chamber has a shape with a cross-section greater than the sum of each cross-section of an opening positioned upstream, each opening corresponding to a first portion leading into the first chamber upstream of the section, and/or
    the second chamber has a shape the cross-section whereof is greater than the sum of each cross-section of an opening positioned downstream, each opening corresponding to a second portion leading into the second chamber downstream of the section.

9. The system according to claim 1, wherein each column includes an internal float device designed to prevent water from reaching from the column into the valves.

10. The system according to claim 1, wherein each column includes an internal float device designed to prevent air from leaving the column (1) through the opening.

11. The system according to claim 1, including a pressure regulating device, designed to adjust the mean of the pressure in the overpressure vessel and of the pressure in the vacuum vessel relative to atmospheric pressure.

12. The system according to claim 1, wherein the overpressure vessel and/or the vacuum vessel includes a water drainage device.

13. The system according to claim 1, further including deflection means of the swell relative to the openings of the columns.

14. The system according to claim 13, wherein the deflection means include movable baffles positioned on either side, and/or below the columns.

15. A unit for converting energy derived from swells and/or from waves including a plurality of systems according to claim 1, the systems being interconnected.

16. The system of claim 1 wherein the overpressure vessel and the vacuum vessel are interlaced above the columns.

17. The system of claim 13, wherein the first portions and the second portions are arranged alternately above the columns.

18. The system of claim 1, wherein
the overpressure vessel includes a part having the general shape of a comb, the first portions forming the teeth of the comb and the first chamber forming the handle of the comb, and/or
the vacuum vessel includes a part having the general shape of a comb, the second portions forming the teeth of the comb, the second portions forming the teeth of the comb and the second chamber forming the handle of the comb.

19. The system of claim 18, wherein the combs of the first vessel and second vessel are then inserted into one another at their teeth.

20. A system for converting energy derived from swell or from waves, including an array of water compression columns, each column having:
a lower end designed to be immersed in a volume of water undergoing swell action, the lower end having an opening to receive the water from the water volume into the column, so as to form a chamber containing a gas in an upper portion of the column,
a first check valve in fluid communication from each said column to an overpressure vessel shared by the columns of the array,
a second check valve in fluid communication from a vacuum vessel shared by the columns of the array, wherein the overpressure vessel and the vacuum vessel are fluidically connected by a turbine,
wherein the columns of the array are arranged contiguously, and the array extends in at least two non-parallel directions,
wherein each column includes an internal float device designed to move within the column, the internal float device having cleaning means of the side walls of the column.

21. The system according to claim 1, wherein the first check valves of the columns of the system are positioned along first lines, and the second check valves of the columns of the system are positioned along second lines.

22. The system according to claim 3, wherein the valves form an alternation of first lines and second lines above the columns.

23. The system according to claim 5, wherein each first line is positioned at a first portion of the overpressure vessel and each second line is positioned at a second portion of the vacuum vessel, the first portions and second portions being positioned alternately above the columns.

24. The system according to claim 23, wherein each first portion, respectively second portion, has an increasing, respectively decreasing cross-section in the gas flow direction.

25. A system for converting energy derived from swell or from waves, including an array of water compression columns, each column having
a lower end designed to be immersed in a volume of water undergoing swell action, the lower end having an opening to receive the water from the water volume into the column, so as to form a chamber containing a gas in an upper portion of the column,
a first check valve in fluid communication from each said column to an overpressure vessel shared by the columns of the array,
a second check valve in fluid communication from a vacuum vessel shared by the columns of the array, wherein the overpressure vessel and the vacuum vessel are fluidically connected by a turbine,
wherein the columns of the array are arranged contiguously, and the array extends in at least two non-parallel directions,
wherein the first check valves of the columns of the system are positioned along first lines, and the second check valves of the columns of the system are positioned along second lines,
wherein the valves form an alternation of first lines and second lines above the columns,
wherein each first line is positioned at a first portion of the overpressure vessel and each second line is positioned at a second portion of the vacuum vessel, the first portions and second portions being positioned alternatively above the columns,
wherein the first portions are each connected to one and the same first chamber of the overpressure vessel positioned between each first portion and the turbine, and the second portions are each connected to one and the same second chamber of the vacuum vessel positioned between each second portion and the turbine, and
wherein the first chamber, respectively second chamber has an increasing, respectively decreasing cross-section in the gas flow direction.

26. The system according to claim 25, wherein:
the first chamber has a shape with a cross-section greater than the sum of each cross-section of an opening positioned upstream, each said opening corresponding to a first portion leading into the first chamber upstream of the section, and/or
the second chamber has a shape with a cross-section greater than the sum of each cross-section of an opening positioned downstream, each said opening corresponding to a second portion leading into the second chamber downstream of the section.

* * * * *